US007408507B1

(12) United States Patent
Paek et al.

(10) Patent No.: US 7,408,507 B1
(45) Date of Patent: Aug. 5, 2008

(54) ANTENNA CALIBRATION METHOD AND SYSTEM

(75) Inventors: Eung Gi Paek, Germantown, MD (US); Mark Parent, Port Tobacco, MD (US); Joon Y Choe, Potomac, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 75 days.

(21) Appl. No.: 11/376,633

(22) Filed: Mar. 14, 2006

Related U.S. Application Data

(60) Provisional application No. 60/662,342, filed on Mar. 15, 2005.

(51) Int. Cl.
*H01Q 3/00* (2006.01)
*H01Q 3/22* (2006.01)
*G01S 1/44* (2006.01)

(52) U.S. Cl. ........................ 342/368; 342/398; 342/375

(58) Field of Classification Search .................. 342/22, 342/54, 78, 167, 172, 174, 360, 368, 375, 342/398
See application file for complete search history.

(56) References Cited

U.S. PATENT DOCUMENTS 4,451,830 A * 5/1984 Lucas et al. ................. 343/768
5,225,839 A * 7/1993 Okurowski et al. ......... 342/174
5,274,381 A * 12/1993 Riza ........................... 342/368
5,373,302 A * 12/1994 Wu ......................... 343/781 P
5,559,519 A 9/1996 Fenner
5,977,930 A 11/1999 Fischer et al.
5,991,036 A * 11/1999 Frankel ....................... 356/364
6,208,287 B1 3/2001 Sikina et al.
6,531,989 B1 * 3/2003 Barker et al. ................ 343/753
6,788,273 B1 * 9/2004 Schultz et al. .............. 343/909
6,836,357 B2 * 12/2004 Wang et al. ................. 359/344
7,023,390 B1 * 4/2006 Kim et al. .................... 343/705
7,204,425 B2 * 4/2007 Mosher et al. .............. 235/492

OTHER PUBLICATIONS

Ron Sorace, "Phased Array Calibration", IEEE Transactions on Antennas and Propagation, vol. 49, No. 4, pp. 517-525 (Apr. 2001).
Herbert M. Aumann and Francis G. Willwerth, "Phased Array Calibrations Using Measured Element Patterns", MIT Lincoln Laboratory, pp. 918-921 (1995).

(Continued)

*Primary Examiner*—Thomas H. Tarcza
*Assistant Examiner*—Harry Liu
(74) *Attorney, Agent, or Firm*—John J. Karasek; L. George Legg

(57) ABSTRACT

A phased array antenna system includes an RF front end, a radome, and an optical calibrator embedded in the radome for enabling in-situ calibration of the RF front end. The optical calibrator employs an optical timing signal generator (OTSG), a Variable Optical Amplitude and Delay Generator array (VOADGA) for receiving the modulated optical output signal and generating a plurality of VOADGA timing signals, and an optical timing signal distributor (OTSD). The in-situ optical calibrator allows for reduced calibration time and makes it feasible to perform calibration whenever necessary.

8 Claims, 15 Drawing Sheets

OTHER PUBLICATIONS

Ashok Agrawal and Allan Jablon, “A Calibration Technique For Active Phased Array Antennas”, Johns Hopkins University APL, pp. 223-228 (2003).

G. A. Hanpson and a> B. Smolders, “A Fast and Accurate Scheme for Calibration of Active Phased-Array Antennas”, pp. 1040-1043 (1999).

Lutz Kuehnke, “Phased Array Calibration Procedures Based on Measured Element Patterns”, 11th International Conference on Antennas and Propagation, Apr. 17-20, 2001, Conference Publication No. 480, pp. 660-663 (2001).

Paul K. Hughes and Joon Y. Choe, “Advanced Multifunction RF System (AMRFS)”, *GOMAC Digest*, pp. 194-197 (2000).

S. Tang, R. Chen, B. Li, and J. Foshee, “Waveguides take to the Sky”, *IEEE Circuits and Devices*, pp. 10-16, Jan. 2000.

* cited by examiner

ANTENNA CALIBRATION METHOD AND SYSTEM

CROSS-REFERENCE TO RELATED APPLICATIONS

This Application is a Non-Prov of Prov (35 USC 119(e)) application 60/662,342 filed on Mar. 15, 2005, incorporated herein by reference.

TECHNICAL FIELD

The present invention is directed to a method and system for calibrating a phased array radar system. More particularly, the invention is directed to an in-situ optical phased array radar calibration method and system.

BACKGROUND OF THE INVENTION

A phased array antenna in an array of antenna elements connected together that are switched between transmit and receive channels. Steering is accomplished by controlling the phase and amplitude of the elements. It is also necessary to adjust the phase and amplitude in order to correct or compensate for errors and inaccuracies due to environmental and other conditions. In order to make the desired adjustments, it is necessary to calibrate and tune the antenna system. The ability for a multi-element array antenna system to electronically form a beam in a predetermined direction is based on the accuracy of both the phase and amplitude settings at each individual element. Phased array antennas typically are comprised of thousands of elements and are able to electronically steer multi-beams throughout a prescribed sector to provide both search and targeting information that is usually integrated with other weapon systems.

Phased array systems have been passive in nature. The advantage that the passive type architecture has over the active type architecture is the ability to be calibrated once at the factory and be able to maintain this calibration over a very long period. This ability is due to the passive nature of many of the components within the beamforming network that provides the amplitude and phase levels at each of the elements. The next generation of ships will favor integrating active type systems that represent a higher degree of complexity then the passive type architecture. Due to the complex nature of these systems, active system calibration is necessary to maintain the ability to operate at the high level of performance necessary to carry out a mission.

Presently, these large antenna apertures are calibrated using a Near Field Scanner (NFS) system prior to placement into the ships super-structure. The NFS uses a small waveguide probe placed close proximity to the antenna aperture and is moved over the complete surface using a 2-axis scanner mechanism. As the probe is positioned in front of each element a small calibration signal is transmitted to the element and associated RF equipment behind the element. This enables a complete electrical characteristic (or calibration) to be performed from each array element to the receiver output. Unfortunately, the physical size and weight of these scanners and the associated mechanical support structure needed to perform this level of calibration makes a scanner type structure unmanageable to be used for in-situ type measurements The ability to inject real time calibration signals into a phased array receive antenna allows the system to maintain a high level of operational performance. This is especially important when an array is being used in a multi-functional role, such as in the Navy's Advanced Multifunction RF Concept (AMRFC), as described in "Advanced Multifunction RF System," P. Hughes, J. Choe, and J. Zolper, *GOMAC Digest,* 194-197 (2000). Previous and current array calibration schemes provide a mix of techniques that are used before and after installation into a platform.

In one approach, array calibration is performed using both internal and external signal injection, which includes near or far field calibration techniques. These techniques record vast amounts of data that become part of a master look up table. This look up table provides corrections for both the amplitude and phase control settings for steering and amplitude weighting of the array. To accomplish the calibration, however, the array is removed or large moveable structures utilized that necessitate placing the system out-of-service while the calibration is performed. The array is therefore typically not recalibrated until it is removed from service when general maintenance is performed, therefore in the interim the system can be well out of calibration.

Another technique described in U.S. Pat. No. 5,559,519, incorporated herein by reference, involves calibrating an active phased array antenna using a test manifold coupled to the transmit output of a plurality of antenna modules. Although the system permits recalibration using a known far-field source, it cannot recalibrate antenna elements that are beyond the test manifold coupler.

Another calibration technique injects small calibration signals after the antenna element. In doing this any mutual coupling that occurs due to the element proximity to each other is not included in the calibration. In order to completely calibrate the array, the element "health" must be included in the calibration to accurately set the amplitude and phase settings. There are other calibration techniques that rely on the "unchanging" nature of the mutual coupling between the elements. These techniques, which provide a powerful calibration capability, become corrupt if the elements themselves become defective.

As array systems become more complex and advanced, the need to have available accurate and up-to-date calibration data becomes apparent. The introduction of advanced active arrays means that future systems will require more frequent calibration than passive arrays.

BRIEF SUMMARY OF THE INVENTION

According to the invention, a phased array antenna system includes an RF front end, a radome, and an optical calibrator embedded in the radome for enabling in-situ calibration of the RF front end. The optical calibrator employs an optical timing signal generator (OTSG), a Variable Optical Amplitude and Delay Generator array (VOADGA) for receiving the modulated optical output signal and generating a plurality of VOADGA timing signals, and an optical timing signal distributor (OTSD). The in-situ optical calibrator allows for reduced calibration time and makes it feasible to perform calibration whenever necessary.

Also according to the invention is a method of calibrating the phased array antenna system, for example in an embodiment where the system includes a DFB laser source for generating an optical calibration signal and a modulator for modulating the light calibration signal and generating a modulated optical output signal, and where the OTSD has a matrix-addressable PLC with N horizontal waveguides and N vertical waveguides for receiving the VOADGA timing signals. The method includes optimizing RF delays to compensate for PLC delays, line-by-line; aligning VOADGA delays so that incoming input signals have the same phase at the entrance of the matrix; adding linear chirp delays to the VOADGA to steer beam directions; optimizing RF delays to match the additional VOADGA delays and record the RF delay values to form a look-up-table (LUT); repeating these steps for all the beam positions along the azimuth and elevation directions; adding additional linear chirp delays to the VOADGA to scan through the beam pattern and to estimate sidelobes; and then tapering RF amplitudes in the RF front-end of the phased array antenna to minimize the sidelobe level.

The invention provides in-situ calibration while including the array element as part of the calibration procedure. Optics offers many advantages over electrical techniques in performing array calibration. First, optics is less sensitive to EMI (electromagnetic interference) than electrical counterparts that require a metallic media for signal distribution. Also, an optical system is simple, compact and lightweight. The systems can be easily embedded inside a radome structure, making them easy to fabricate and making a permanent installation, permitting in-situ calibration. Finally, an optical system like the one here requires a shorter calibration time, making it feasible to perform the task whenever necessary.

One of the key features of the architecture is the matrix-addressing (as opposed to individual addressing) scheme to significantly reduce the hardware complexity and to simplify its operation. The architecture combines both precision due to the planar lightwave circuit (PLC) and flexibility due to individually variable time delays. Also, the calibration procedure is simple, fast and does not require frequent calibration of the optical calibrator because the main calibration part is already accomplished. The system is fully programmable and automatic, minimizing required manpower.

Incoming wavefront from various directions can be generated. That is, the invention provides the capability to create a virtual plane wave across the array aperture. Since each probe can have its own phase and amplitude setting a synthesized plane wave can be placed across the array aperture. The phased array system can thereby undergo system performance verifications without necessitating the use of actual weapons systems (or simulators). With the optical calibration implementation, signals with various phase fronts and modulations can be injected into the array. These signals can represent signals from a given direction with a modulation response representing a "jammer" type function. The actual system response can then be evaluated and from it determine the effectiveness of the system to an actual jamming type function.

Another advantage is that the system is compact and inexpensive.

DETAILED DESCRIPTION OF THE INVENTION

Figure 1:
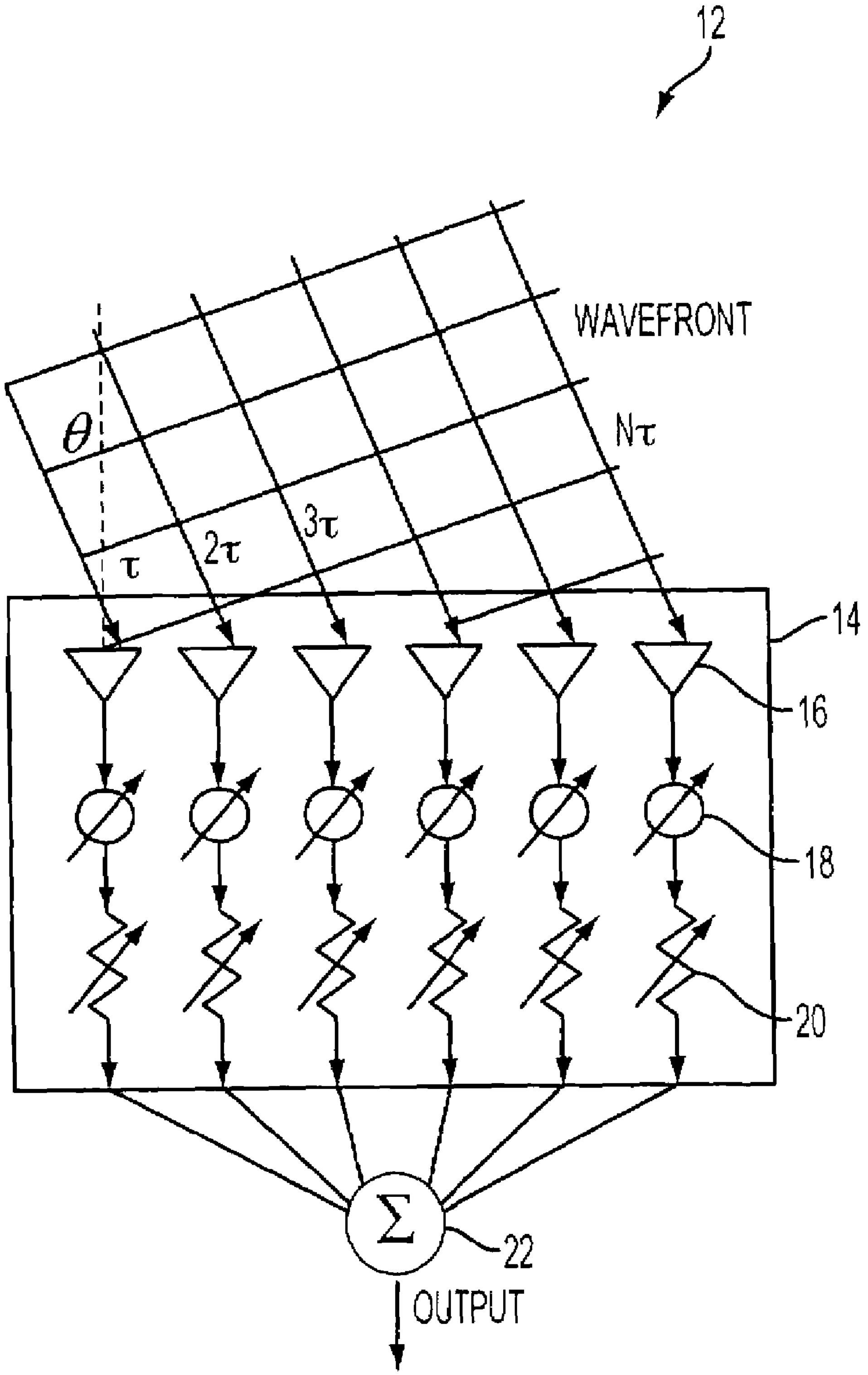
FIG. 1 is a schematic diagram of a phased array radar system illustrating the desired characteristics of an in-situ calibrator.

FIG. 1 illustrates the desired characteristics of an in-situ optical calibrator 10 (see also FIG. 2) in a phased array antenna 12. The calibrator should distribute a: modulated RF signal over the aperture of an RF front-end 14, with an adjustable relative time delay, $\tau$, between adjacent antenna elements 16, each connected to an adjustable phase shifter 18 and an adjustable attenuator 20 with outputs combined in a summer 22. For example, consider a system with a 24×24 element array antenna, an RF frequency range from 4 to 20 GHz and beam steering angles from −45° to 45° along the azimuth and elevation directions. The required delay resolution should be less than 1% of the period, which becomes 0.5 ps for the 20 GHz signal.

Figure 2:
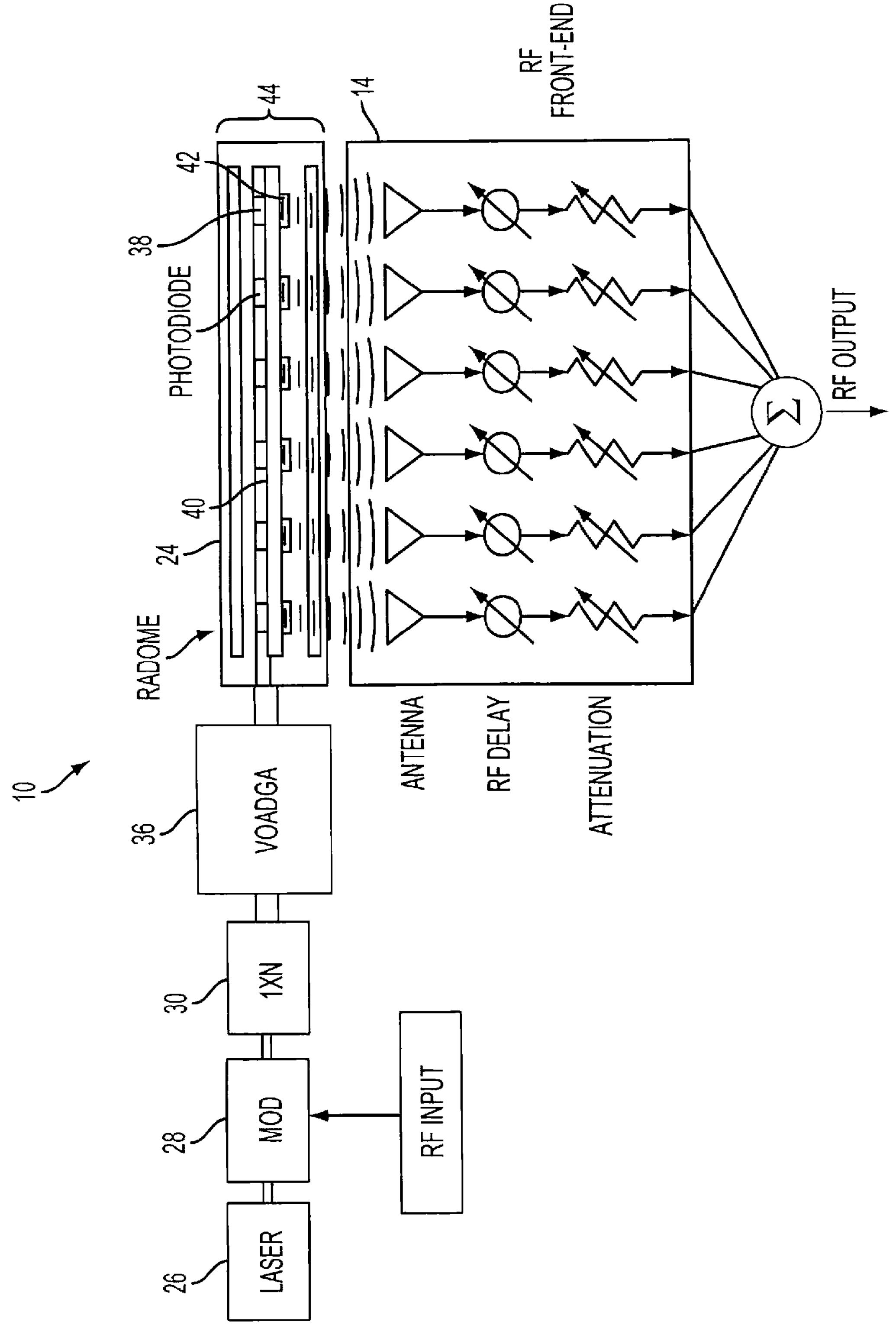
FIG. 2 is a schematic diagram of an optical calibrator in accordance with the invention.
Figure 3:
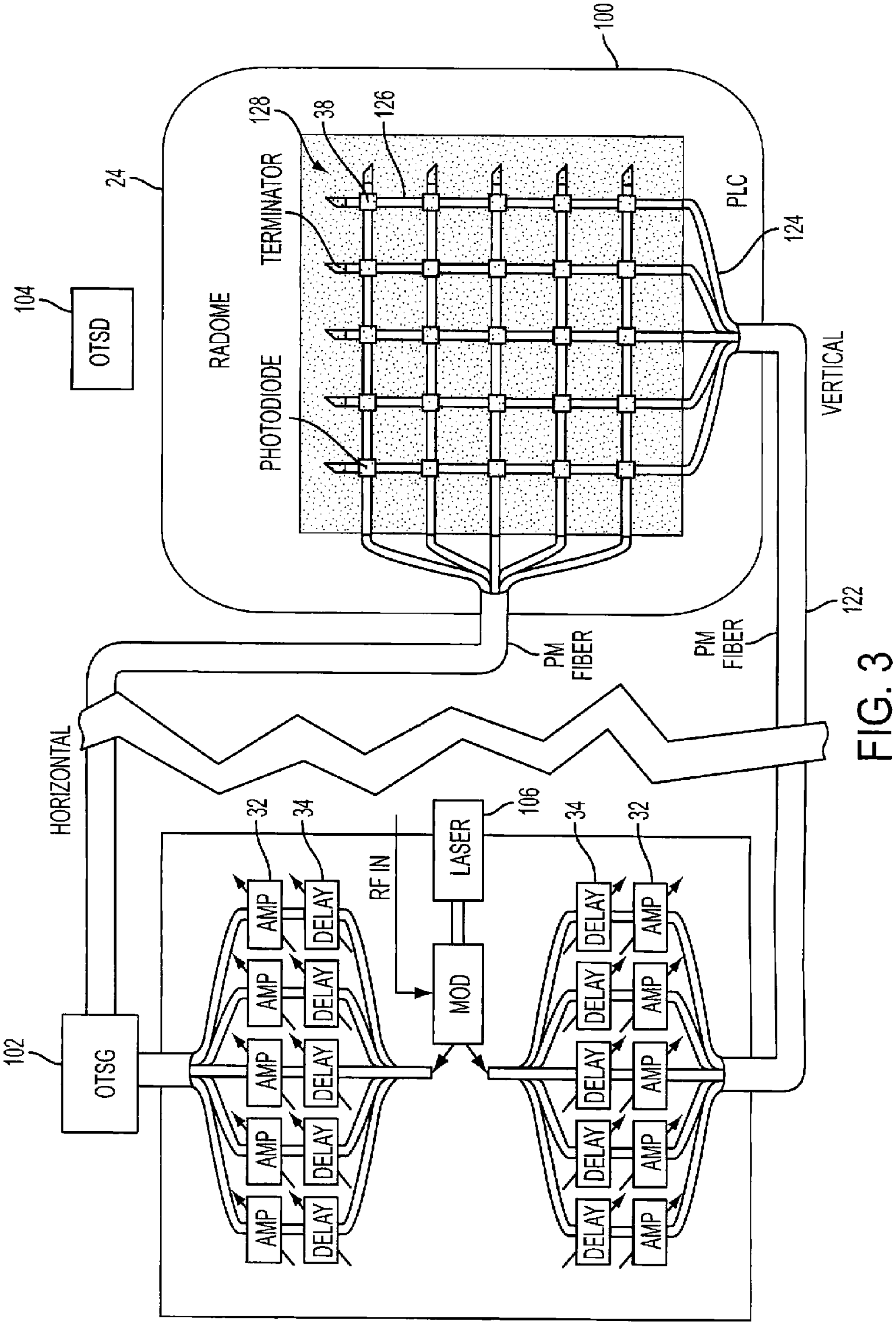
FIG. 3 is a schematic diagram of an optical calibrator in accordance with the invention.

FIG. 2 illustrates optical calibrator 10 embedded inside a radome 24. Light from a laser 26 is modulated by an optical intensity modulator 28 at RF input signal and is split into N fiber channels by a 1×N splitter 30, where N is the number of antenna elements. Referring also now to FIG. 3, the light signal in each channel is appropriately attenuated and delayed using a variable optical attenuator (VOA) 32 and a variable delay generator (VDG) 34. An array of N channel devices with the combined functionality is called VOADGA (Variable Optical Attenuator and Delay Generator Array) 36. The resulting signals are sent to an array of photodiodes 38 through optical waveguides 40—either optical fibers or a planar lightwave circuit (PLC) as further described below. The current generated by each photodiode 38 drives a microstrip antenna (RF probe patch antenna) 42. The RF signal generated by the microstrip antenna 42 is then used to calibrate the RF front-end 14. The multi-stack radome 44 shown in FIG. 15 consists of three separate radomes 46 and each radome 46 has an frequency selective surface (FSS) 48 to reduce RCS (Radar Cross Section).

FIG. 3 illustrates a preferred architecture for the optical timing signal distribution network, which consists of two parts: an optical timing signal generator (OTSG) 102 and an optical timing signal distributor (OTSD) 104. OTSG 102 is located in a box outside of the radome 24 and consists of a distributed feedback (DFB) laser source 106, e.g. at a wavelength of 1550 nm, an analog intensity modulator 108, e.g. at a frequency of 20 GHz, and a pair (for row and column, respectively) of 1×N splitters 110 and VOADGAs (Variable Optical Amplitude and Delay Generator Arrays) 36. The VOADGAs 36, in turn, consist of an array of variable optical attenuators 32 and delay generators 34, as described in more detail below. Each of the VOADGAs 36 individually generates a timing signal with a desired amplitude and delay with sufficient precision. The dynamic range of the VOAs 32 are preferably selected broad enough such that the VOAs can function as an ON/OFF switch. The N optical timing signals thus generated by the OTSG 102 are connected to the OTSD 104 through a fiber bundle 122 with N polarization-maintaining (PM) fibers 124.

The OTSD 104 is embedded inside the radome 24. The matrix-addressable PLC 100 consists of N horizontal waveguides and N vertical waveguides 126 as shown in FIG. 3. At each intersection 128 of the cross-running waveguides 126, a photodiode 38 is located to sense a small portion of the light evanescently coupled at the junction. The electrical output from each photodiode 38 is coupled to a micro RF antenna 131 (described below and shown in FIG. 14) that is located close to the corresponding detector. All the waveguides 126 are properly terminated to limit the amount of light reflecting back into the waveguide. This can be achieved by making the end surface of the waveguide slanted to have an angle (around 8 degrees in case of silicon-based waveguides) with respect to the normal to the beam propagation direction. Also, evanescent beam coupling using grating or prism structures or multilayer highly transparent coating at the end surfaces can be employed for termination. As is evident, this matrix-addressing scheme provides a significant reduction in hardware complexity from $N^2$ to 2N compared to alternative designs employing non-cross-running waveguides.

Figure 4:
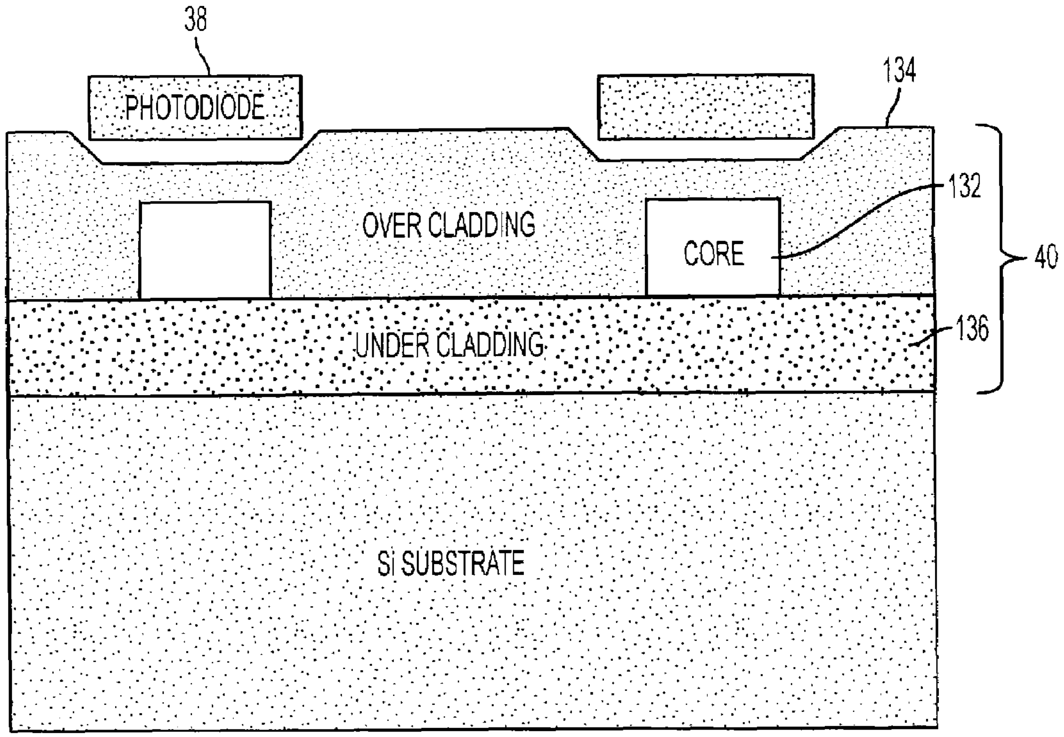
FIG. 4 is a cross-sectional illustration of a matrix addressable PLC in accordance with the invention.

One of the most desirable features of a PLC 100 is the accuracy with which its dimensions can be defined and realized. Due to the lithographic procedures commonly used for semiconductor chip manufacturing, the dimensions of PLC 100 can be very precisely defined with sub-micron resolution. This corresponds to only less than 1% of the required timing resolution. FIG. 4 illustrates a cross-sectional view of a PLC 100, with an array of optical waveguides 40 consisting of a core 132 surrounded by cladding layers 134 and 136. Light propagates through the core 132. To permit a small portion of the light to couple evanescently to a photodiode 38 at the intersection 128, the over-cladding layer 134 is selectively etched down. Furthermore, the core 132 size should be small to support only a single mode to avoid modal dispersion, as follows. Inside the fiber or waveguides, different wavelengths of light propagate at different speeds. As a result, a wideband signal at the input becomes smeared at the output. The amount of time delay $\Delta t$ is proportional to the length of the fiber (L) and the spectral linewidth of the laser source ($\Delta\lambda$) and is given by $\Delta t = D_\lambda \cdot L \cdot \Delta\lambda$, where $D_\lambda$ is called the dispersion coefficient, which is 17 ps/nm-km for standard, SMF-28 single mode fibers. A single mode PLC 100 is expected to have a similar amount of dispersion. The spectral linewidth of a DFB laser 106 modulated at 20 GHz is approximately 0.16 nm. Therefore, the total amount of dispersion over a length of 2 m is $5.44\times10^{-3}$ ps. This is only 1% of the required timing resolution of 0.5 ps.

As discussed above, a PLC 100 can have a timing resolution of 0.005 ps, or $10^{-4}$ of the period at 20 GHz. The change in optical path length of an optical waveguide (including both optical fibers and PLCs) due to temperature variation can be described as $$\Delta(OPL) = \Delta(nL) = \frac{\partial n}{\partial T}\cdot\Delta T\cdot L + n\cdot\frac{\partial L}{\partial T}\cdot\Delta T = nL\cdot\left(\frac{1}{n}\frac{\partial n}{\partial T} + \frac{1}{L}\frac{\partial L}{\partial T}\right)\cdot\Delta T$$

The first term within the parenthesis refers to the thermo-optic effect and the second term refers to the thermal expansion coefficient (CTE). For $SiO_2$ (the waveguide material for optical fibers and PLCs), the combined number in the parenthesis becomes $7.6\times10^{-6}$/° C. For N=24 and the temperature variation of 20° C. (during the calibration period of approximately one hour), the maximum time delay due to the combined dispersion and temperature effects becomes $3.5\times10^{-3}$ of the period. Therefore, the PLC can be considered precise enough to be used as a reference for calibration.

The center wavelength of a DFB laser drifts at a rate of 0.1 nm/° C. Also, the dispersion coefficient of an SMF-28 fiber varies as 0.001 ps/(° C.-nm-km). For a temperature variation of 100° C., total time delay becomes 0.34 ps, which is less than the required timing resolution of 0.5 ps. Further, a dispersion-shifted fiber or a different wavelength (1310 nm) can be used for even lower dispersion. Therefore, dispersion does not present a substantial source of error in the practice of the invention.

Figure 5:
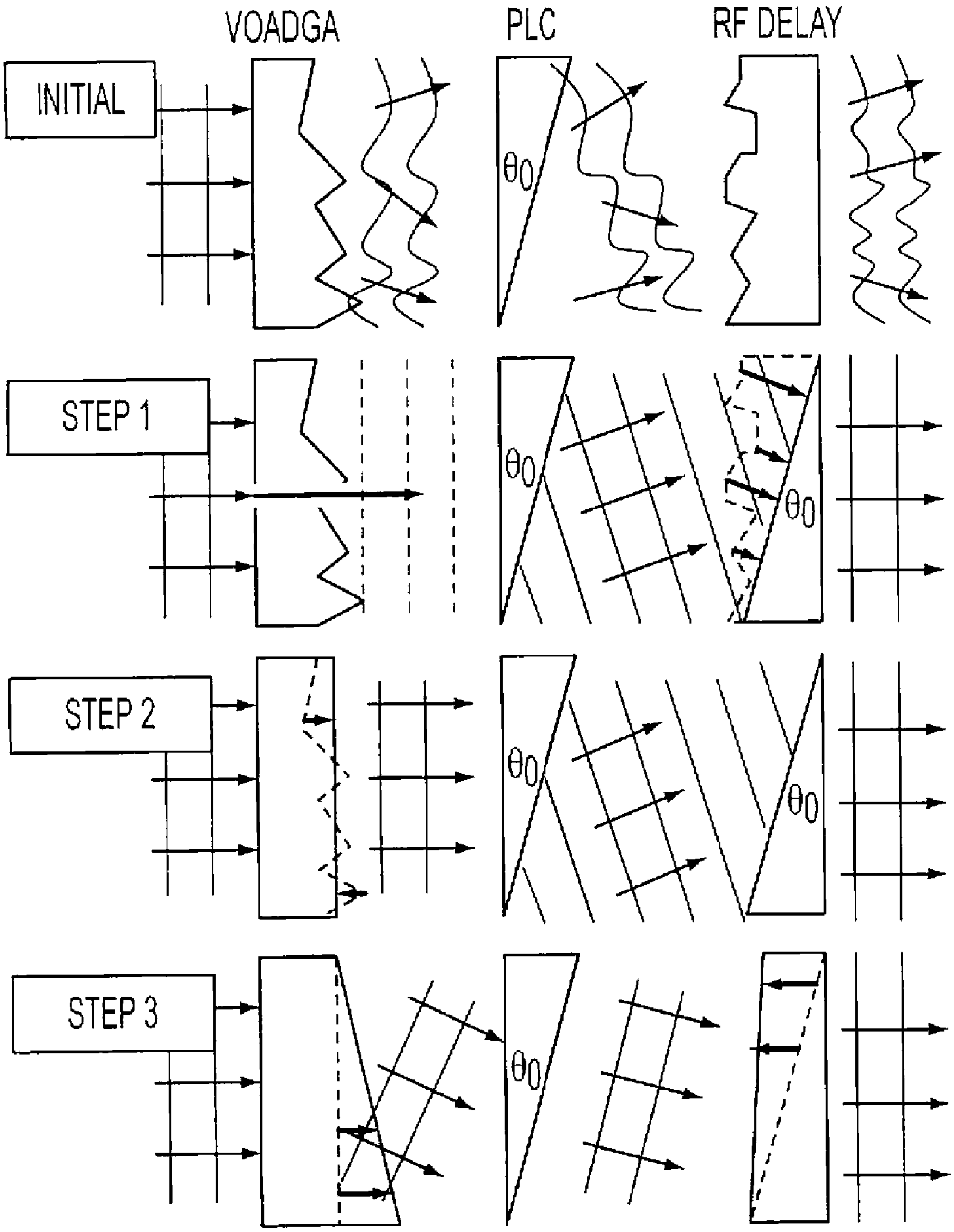
FIG. 5 is an illustration of a calibration method in accordance with the invention.

The calibration procedures involve three different time delays: VOADGA delays (variable optical delays by VOADGAs 36), PLC delays (fixed optical delays by PLC 100) and RF delays (variable delays by the RF front-end). Initially, VOADGA delays are unknown and RF delays are un-calibrated. However, as explained before, PLC delays are very precisely defined with a tilt angle $\theta_0$. Therefore, the PLC delays are preferably used as a reliable standard for the calibration. FIG. 5 depicts the following three-step calibration procedure:

STEP 1. Optimize RF delays to compensate for the PLC delays, line-by-line.

STEP 2. Align VOADGA delays so that incoming input signals have the same phase at the entrance of the matrix.

STEP 3. Add linear chirp delays to VOADGA to steer beam directions. Optimize RF delays to match the additional VOADGA delays and record the RF delay values to form a look-up-table (LUT). Repeat STEP 3 for all the beam positions along the azimuth and elevation directions.

In the following, STEPs 1 and 2 will be described in more details.

STEP 1—Optimize RF delays to compensate for the PLC delays ($\theta_0$) (Line-by-Line)

Figure 6:
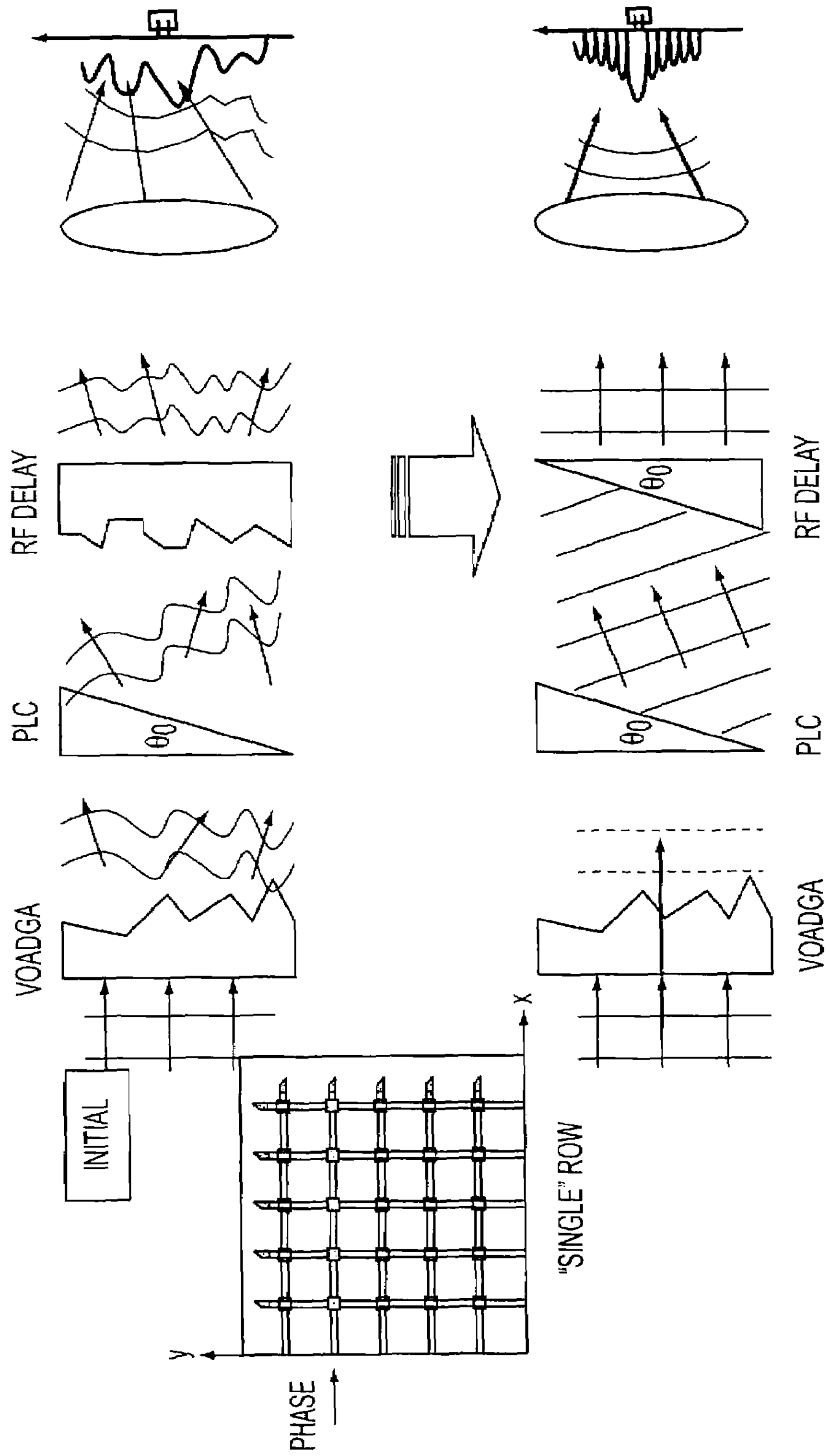
FIG. 6 is an illustration of a step in a calibration method in accordance with the invention.

In this step, we would like to optimize RF delays to compensate for the fixed PLC delays. However, since VOADGA delays are not aligned in the beginning, the output wave from the VOADGA is not a plane wave. As a result, even though RF delays and PLC delays are matched, no peak will appear at the center as shown in FIG. 6. Without an expected target peak, optimization cannot be accomplished. In order to balance the RF delays in reference with the PLC delays even with unaligned VOADGA delays, we demonstrate that to turn on only a single row at a time. As explained previously, a single row alone can still form a sharp peak regardless of initial delay (phase).

STEP 2—Line-by-Line Optimization (Independent of phase relationships along the other direction)

Figure 7:
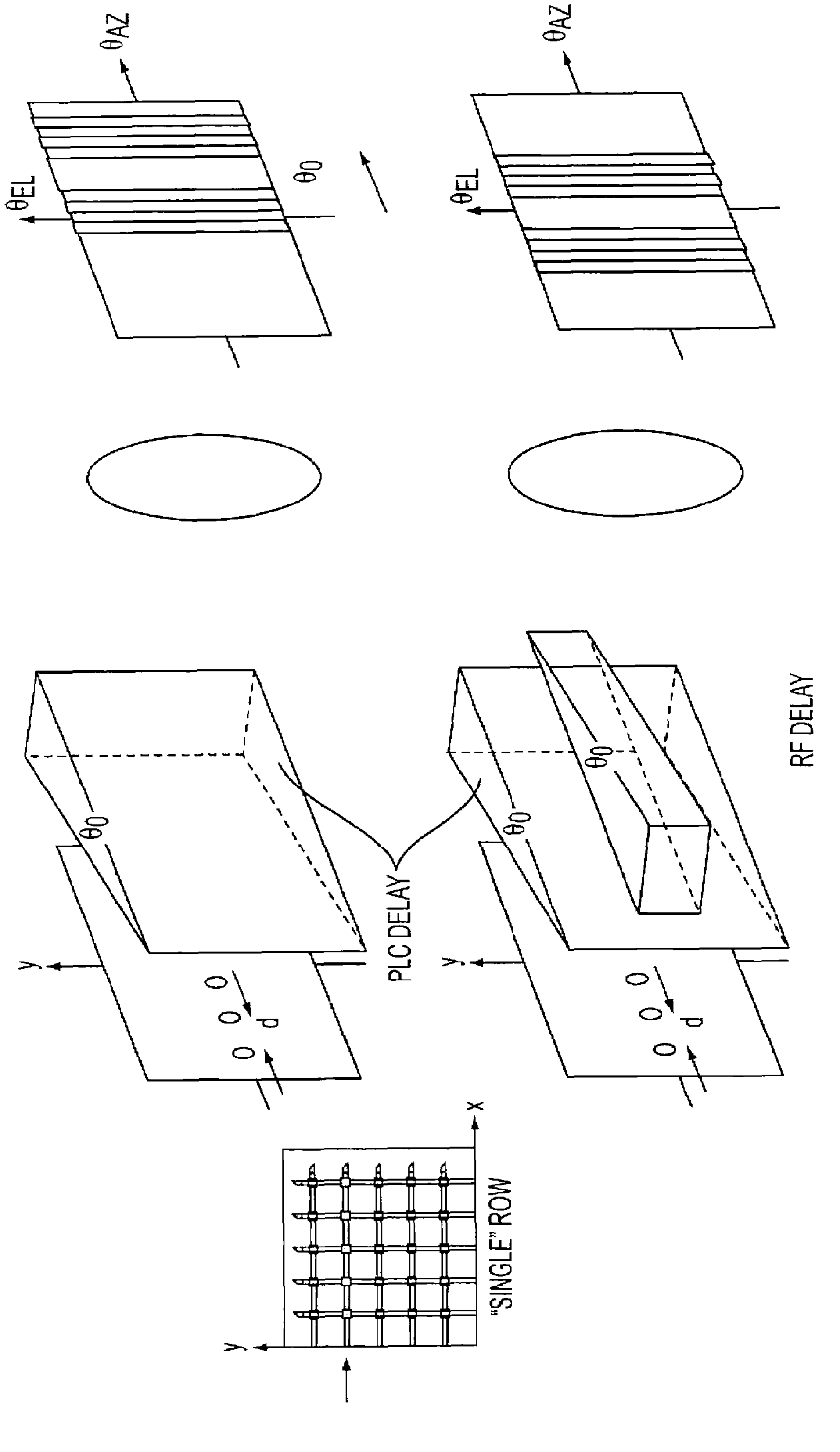
FIG. 7 is an illustration of a step in a calibration method in accordance with the invention.

As explained before, by turning on a single row at a time, a far field pattern (spectrum) with a sharp peak can always be obtained regardless of the initial phase due to the shift-invariant property of Fourier spectrum. Also, the spectrum is shifted by $\theta_0$ from the center by the wedge prism effect of the PLC, as explained before. Now each of the N RF delays at corresponding row can be optimized to compensate for the PLC delays as shown in FIG. 7. Conventional optimization methods with N variables can be used to maximize output. If the amplitude adjustment in the RF front-end can be used as a RF switch by minimizing or maximizing the amplitude output, the following procedure that does not require optimization procedure can be used. This procedure is repeated for all the rows and columns iteratively several times.

Reference Beam Position at $\theta_{AZ}=\theta_{EL}=\theta_0$

Figure 8:
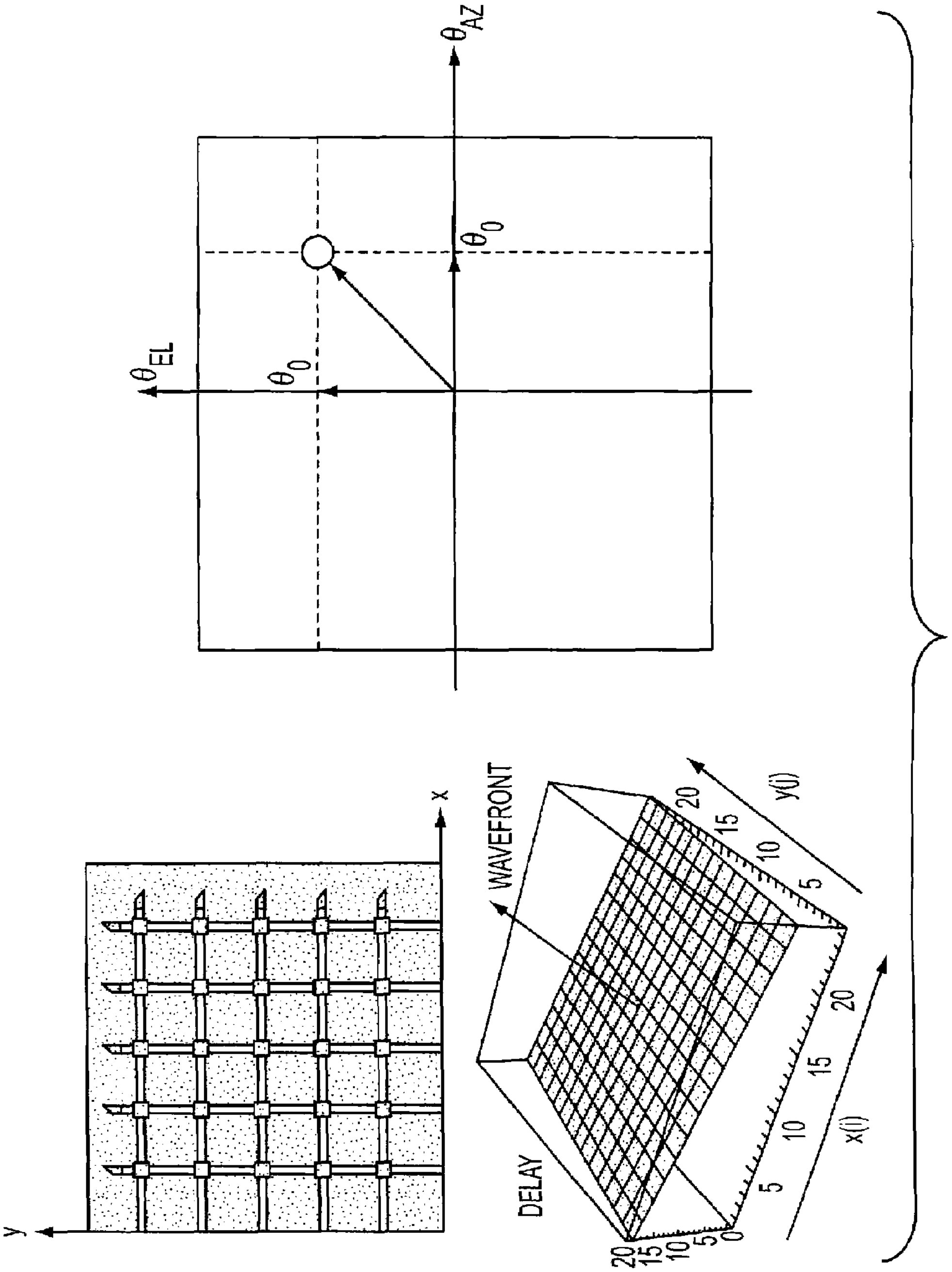
FIG. 8 is an illustration of a step in a calibration method in accordance with the invention.

From the above STEP 1, RF delays linearly chirped along both x and y directions are obtained as shown in FIG. 8. The chirping ratio is determined by the separation between adjacent photodiodes. Also, the normal to the wavefront is the pointing direction of the RF beam and can be represented by the point in the beam space along the azimuth—elevation directions, as shown in FIG. 8 (right).

Amplitude Adjustment

So far, we have considered phase (or delay) adjustment only. Now, we will describe amplitude adjustment to reduce sidelobes. The amplitude adjustment may be accomplished independently from phase after phase adjustment is completed. The procedure is as follows:

For given VOADGA and RF delays aimed at a certain point in the beam space, add additional linear chirp delays to the VOADGA to scan through the beam pattern and to estimate sidelobes. Then, taper RF amplitudes in the RF front-end to minimize the sidelobe level.

The VOADGA 36 is an array of a combination of a variable optical attenuator (VOA) 32 and a variable delay generator (VDG) 34. The VOA 32 should be able to reduce light intensity with a large dynamic range (e.g., at about a 13 bit resolution) so that it can function as an on/off switch as well. The VDG 34 preferably generates time delays up to about ins (depending on N), with a resolution of about 0.5 ps. Although VOAs using various technologies such as liquid crystals, MEMS, PLC, etc, are readily available, and VDGs are commercially available as COTS components, the invention provides an integration of the two functions in a compact package. As such, VOADGAs 36 function as an optical equivalent of the delay and amplitude adjusting units in an RF front-end, and are amenable to other applications requiring the functionality including various coherent analog signal processing such as phased array antennas, coherent communications, RF link emulation, THz signal generation and femto-second pulse shaping, phase noise measurement, and optical signal processing.

Figure 9:
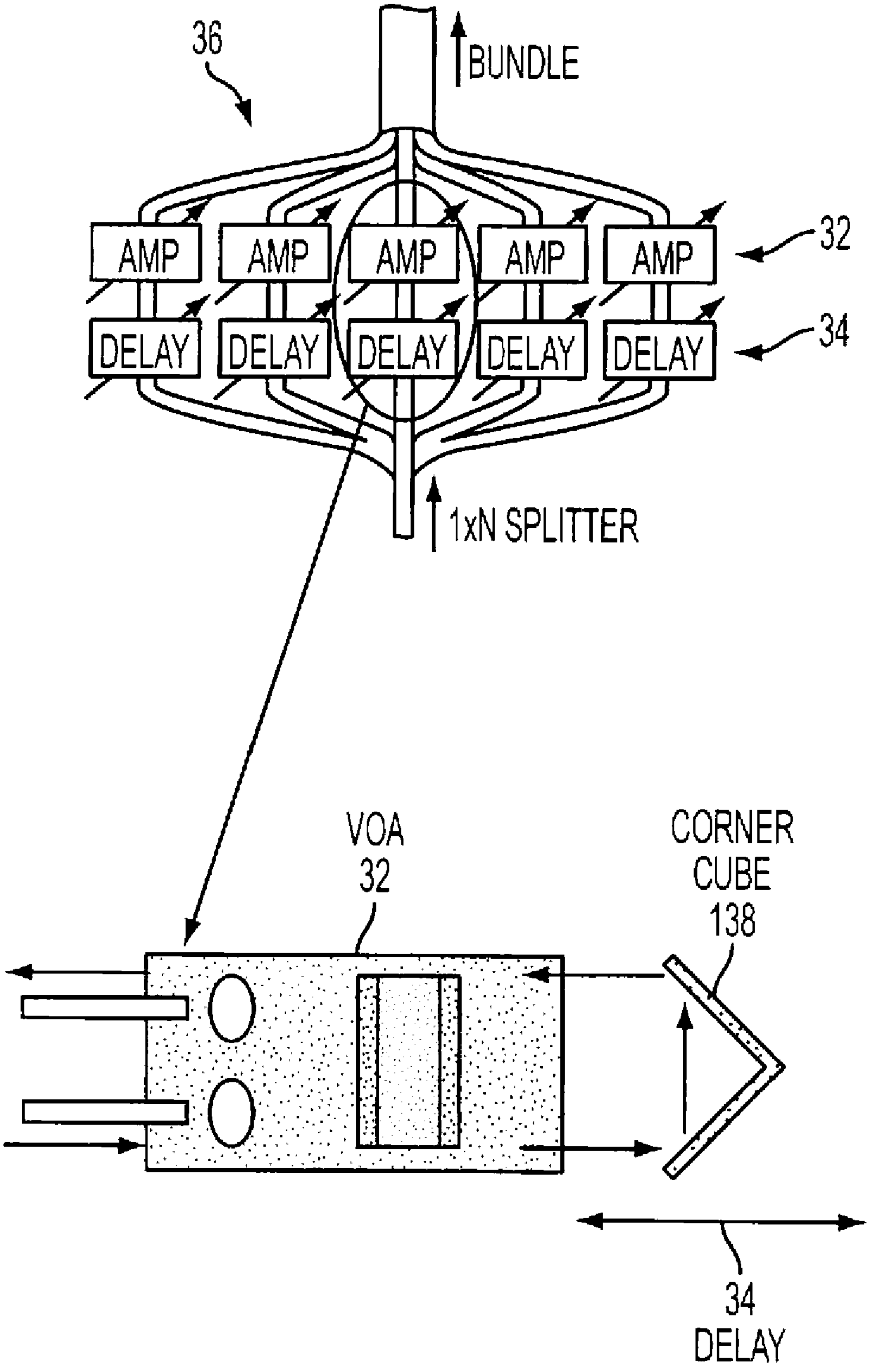
FIG. 9 is a schematic diagram of a free-space variable optical attenuator and delay generator array (VOADGA) in accordance with the invention.

VOADGAS 36 can be implemented using bulk optics by inserting a corner cube 138 mounted on a translation stage inside a VOA 32, as shown in FIG. 9. Light from a fiber is collimated by a micro-collimating lens (e.g. GRIN lens) and is modulated by a VOA which is a spatial light modulator to vary the amplitude of output light. Various devices such as liquid crystals, MEMS (micro-electro-mechanical system), electro-optic crystals (PLZT, lithium niobate, etc.) or acoustic modulators can be used for this purpose. The modulated light is suitably delayed by translating a corner cube to generate desired time delay and is passed through the VOA again. Such double-pass though a VOA increases dynamic range significantly—twice in dB. The output light from the VOA is coupled to an output fiber through a micro-focusing lens. To permit compact packaging, micro-optic miniaturization of components and integration technique can be used. The entire package is hermetically sealed to provide environmental stability.

Figure 10:
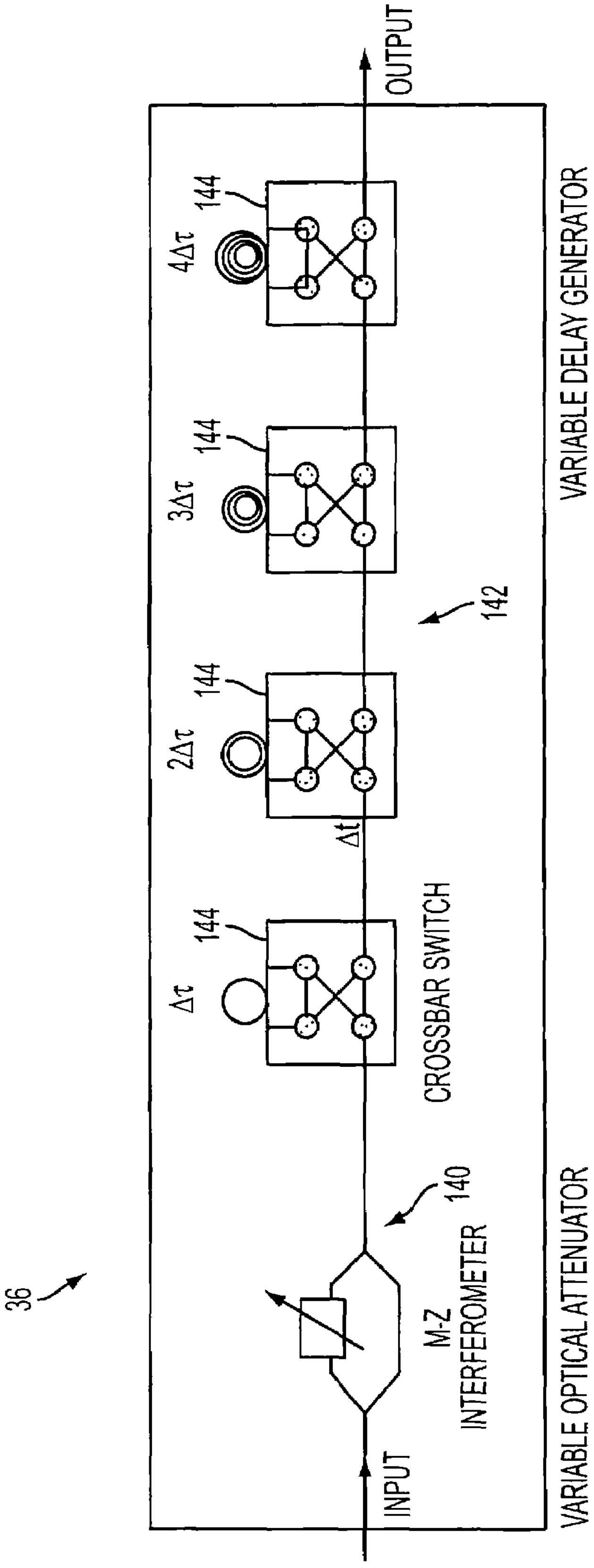
FIG. 10 is a schematic diagram of a PLC-based VOADGA.

VOADGA can be implemented using the PLC technology as shown in FIG. 10. VOADGA 36 includes a Mach-Zehnder waveguide interferometer-type VOA 140 to provide variable attenuation of light (VOA) input from laser 106. The attenuated light is then delayed in DGA 142 using digital waveguide crossbar switches 144. VOA 140 and DGA 142 are integrated on a single substrate, as discussed above. PLC-based DGA's are commercially available from several vendors including Little Optics in MD. By incorporating the VOA part with the existing PLC-based DGA, VOADGA functionality can be achieved.

Matrix Addressable PLC

The PLC 100 preferably includes:

Precise timing control (precision: 1 μm in length or <0.005 ps in time)

Detector should sense the combined light power from both rows and columns: about −20 dBm Crosstalk at the junction: <−20 dB Waveguide: single mode (core size less than 8×8 microns)

Dispersion: 17 ps/nm-km approx.

No temperature control needed.

Reliability: GR468 compliant

Normally, the coupling of the light from a waveguide (or fiber) to free space can be achieved by etching fibers, creating a Bragg grating inside a fiber, or recording a volume hologram on planar waveguides, e.g. as described in "Waveguides take to the sky," S. Tang, R. Chen, B. Li and J. Foshee, *IEEE Circuits and Devices*, January 10-16 (2000). Most of these fabrication techniques are performed on each individual fiber, and so are time-consuming. The present invention includes a modified fabrication method that can be performed simultaneously and fast, as follows. After PLC waveguides are formed using conventional fabrication procedures, the upper-cladding layer 134 (shown in FIG. 4) is slightly etched at the intersections 128 using lithographic technique to permit evanescent beam coupling in the desired direction (towards the detector). The etching time can be varied to adjust the light-coupling ratio to the desired value. Dry etching techniques (ion milling, reactive ion etching, etc.) can be used for more precise control of the thickness. Also, the numerical aperture (NA) of the waveguide can be optimized to avoid beam transmission along the undesired orthogonal direction that contributes to crosstalk, while still maintaining single mode operation.

Photodiodes

Normally, high-speed photodiodes 38 are operated with a bias voltage. If a detector is operated without a bias voltage (photovoltaic mode), the speed becomes quite limited. However, a copper wire inside a radome structure can cause EMI and so should be avoided. Accordingly, detectors should be operated in the bias-free mode. Bias-free PIN InGaAs photodiodes that can be operated up to 30 GHz are available, e.g. from Discovery Semiconductor Technology, Inc. As these photodiodes have extremely low dark current, noise equivalent power is not readily measurable and is projected as less than about 1 nW at high frequencies, with maximum saturation input optical power of about 3 dBm. The amount of time delay is reproducible to within less than about 0.5 ps, according to the specs. One can also select photodiodes with similar delays by obtaining them from the same manufacturing run. In this way, time delay differences among photodiodes can always be kept to be less than our timing resolution of 0.5 ps.

Table 1 lists all the sources of light loss. The light into each detector is around −27.5 dBm (1.7 microwatts). This value is well within the operational range of the detector whose minimum detectable sensitivity is less than <1 nW and detector saturation power is +3 dBm (or 2 mW).

TABLE 1

| Laser output | 50 mW (or +17 dBm) |
|---|---|
| Losses (Total) | 24.5 dB |
| IL of a modulator | 3 dB |
| IL due to 1:24 splitter | 15 dB |
| IL of VOA | 0.8 dB |
| IL of VDG (variable delay generator) | 1.0 dB |
| IL of PM fiber bundle | 0.7 dB |
| IL of PLC | 4.0 dB |
| Light coupling to Photodiode | −20 dB |
| Light into each Photodiode | −27.5 dBm (1.7 mW) |
| Operational range of a photodiode (1 nW to 2 mW) | −60 dBm to +3 dBm |

Micropatch Antenna

Figure 11:
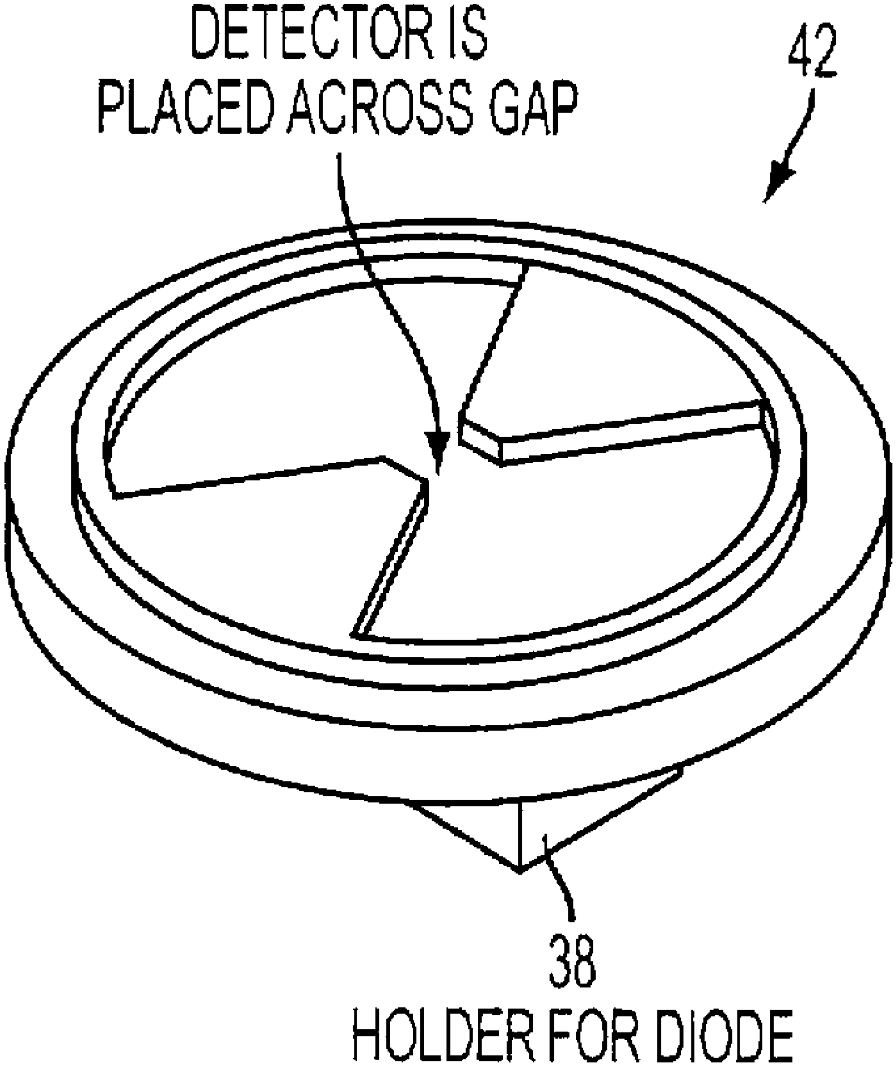
FIG. 11 is a schematic diagram of a micro-patch antenna coupled with a photovoltaic detector.

FIG. 11 shows a microstrip antenna 42 connected with a photodiode 38. The current generated by the photodiode drives the microstrip antenna and generates the desired RF signal. The microstrip antenna 42 provides both an appropriate DC current path for the photodiode 38 and a method of coupling a signal into an element with minimum interaction with the array elements. Since the amount of signal required for calibration is small the microstrip antenna 42 can be relatively inefficient, which decreases the amount of array-element interaction.

Smart Radome Construction

Figure 12:
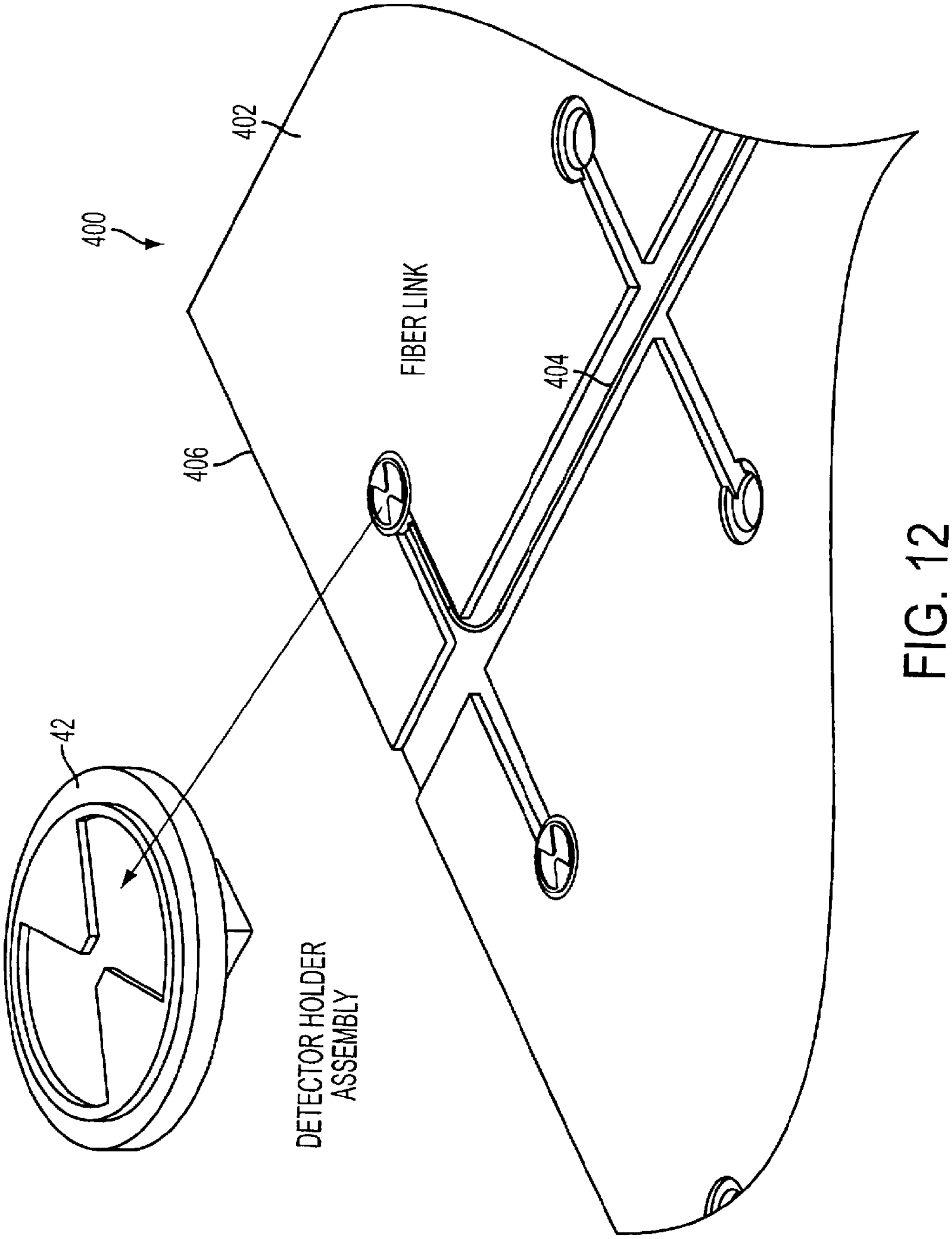
FIG. 12 is an illustration of a microstrip antenna embedded in high density foam material illustrating detail of its fiber distribution and typical probe-detector assembly in accordance with the invention.
Figure 13:
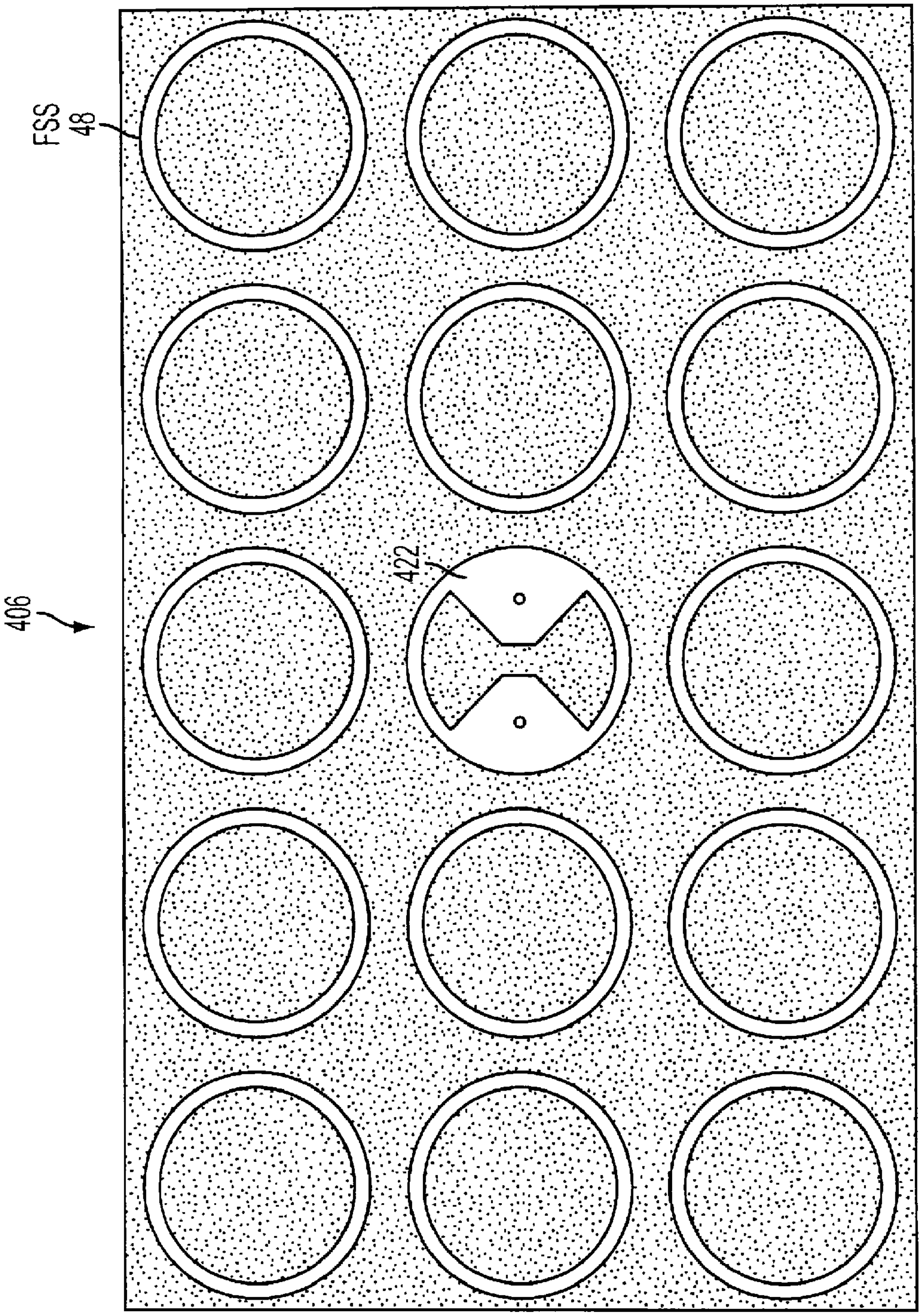
FIG. 13 an illustration of a microstrip antenna imbedded in a multi ring FSS structure.

Another embodiment illustrating a smart radome 400 is shown in FIG. 12. The microstrip antennas 42 are embedded in a carrier 402 of low loss high density foam material and are coupled to optical fibers 404. Inserting each microstrip antenna 42 individually into the carrier 402 would be very labor intensive especially in construction of large panels. Since most antenna systems being developed today incorporate some type of Frequency Selective Surface (FSS) 406 for RCS control, a microstrip antenna 42 may be included in the FSS 406. Many FSS designs use either a ring or multi-sided object as a basic element. Since this basic element is very similar to the microstrip antenna 42 it is possible to integrate it into the FSS 406 without modifying the properties of the FSS structure. For example, a simple three layer FSS (not illustrated) may incorporate the microstrip antenna 42 in the middle layer. FIG. 13 illustrates a section of an FSS middle layer 406 containing the microstrip antenna 42.

PLC-Based On-Chip Integration

Figure 14:
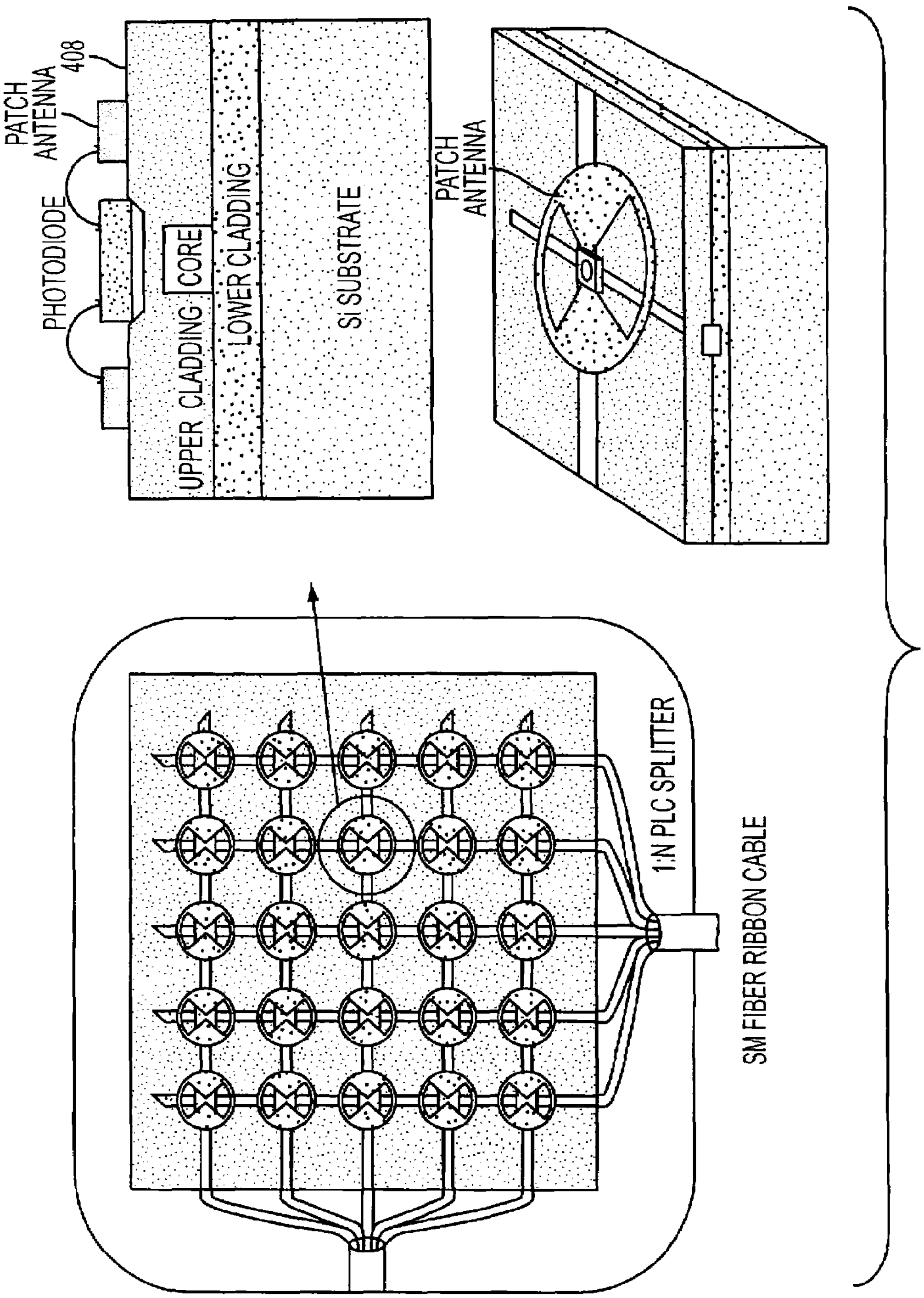
FIG. 14 is a schematic diagram illustrating integration of micro-antenna with PLC in accordance with the invention.

The micropatch antenna 42 pattern can be integrated with PLC by metalizing directly on the wafer surface 408 as shown in FIG. 14. In this way, the positions of antennas, photodiodes, and lightpath can be precisely controlled by the lithographic procedure and manufacturing procedure can be greatly simplified.

Multistack Radome Assembly

Figure 15:
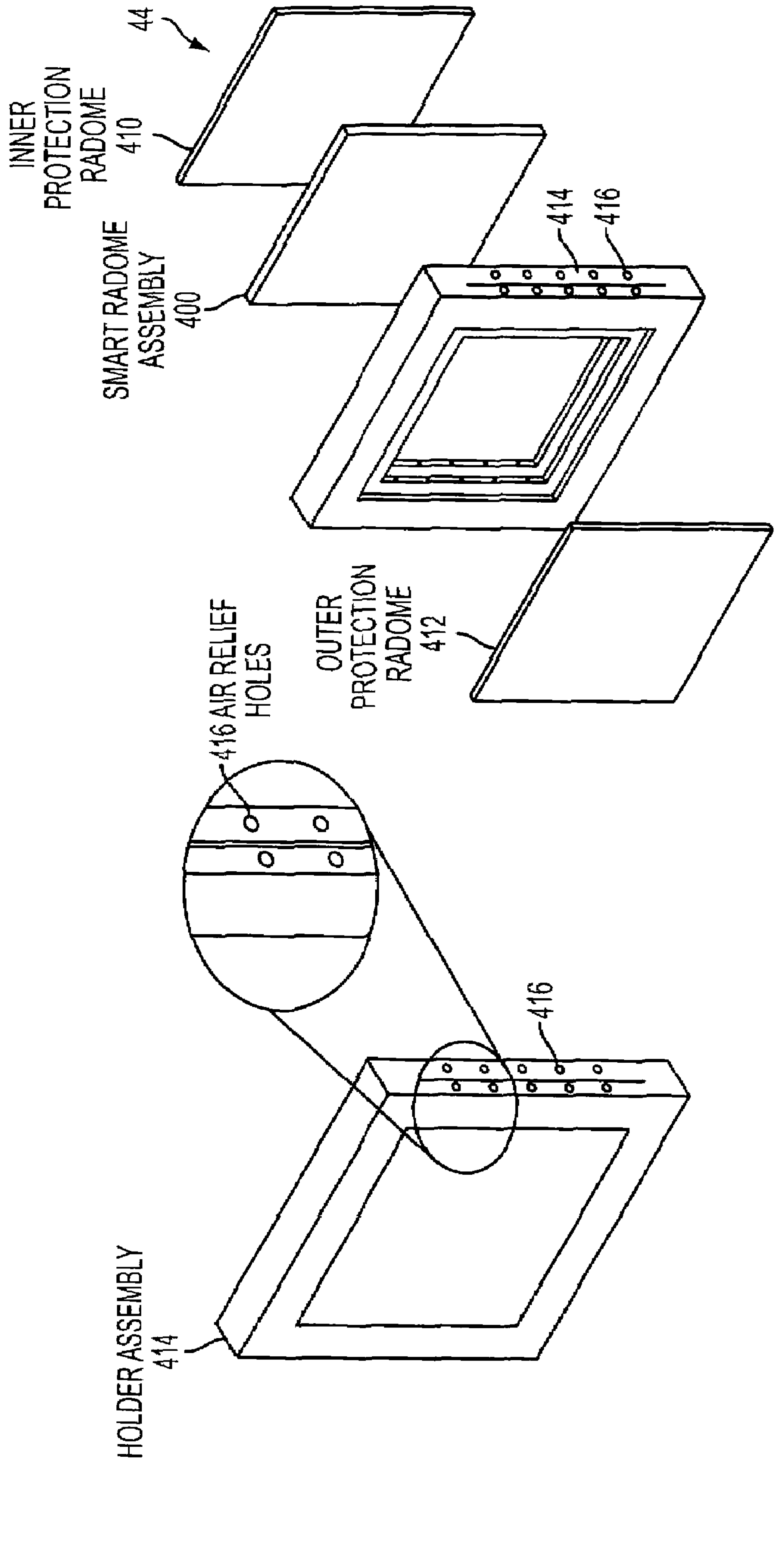
FIG. 15 is an illustration of a multi-stack radome assembly.

FIG. 15 is an exploded view (right) along with an integral view (left) of the configuration of a multi-stack radome assembly 44 which consists of three separate radome layers. The smart radome 400 includes an OTSD 104 (described above) and is positioned between an inner protective radome 410 and an outer protective radome 412 all of which are secured in a holder 414. Utilizing a multi-stack configuration, in combination with several air relief passages 416, decreases pressure induced flexure across the smart radome assembly. All of the standard ballistic-required design elements are preferably incorporated into the outer radome and therefore not required in the smart radome.

Obviously many modifications and variations of the present invention are possible in the light of the above teachings. It is therefore to be understood that the scope of the invention should be determined by referring to the following appended claims.

What is claimed as new and desired to be protected by Letters Patent of the United States is:

1. A method of calibrating a phased array antenna housed within a radome, comprising:

a) providing an optical timing signal generator (OTSG) having a DFB laser source for generating an optical calibration signal, a modulator for modulating the light calibration signal and generating a modulated optical output signal, and a Variable Optical Amplitude and Delay Generator array (VOADGA) for receiving the modulated optical output signal and generating a plurality of VOADGA timing signals, and an optical timing signal distributor (OTSD) housed within the radome for receiving the plurality of VOADGA timing signals, the OTSD having a matrix-addressable PLC having N horizontal waveguides and N vertical waveguides for receiving the VOADGA timing signals, said wave guides having a plurality of intersections, each intersection having a photodiode positioned thereon for receiving a portion of the VOADGA timing signals and for generating a proportional electrical output signal for subsequent processing and calibrating of the phased array antenna;

b) optimizing RF delays to compensate for PLC delays, line-by-line;

c) aligning VOADGA delays so that incoming input signals have the same phase at the entrance of the matrix;

d) adding linear chirp delays to VOADGA to steer beam directions;

e) optimizing RF delays to match the additional VOADGA delays and record the RF delay values to form a look-up-table (LUT);

f) repeating steps d)-e) for all the beam positions along the azimuth and elevation directions;

g) adding additional linear chirp delays to the VOADGA to scan through the beam pattern and to estimate sidelobes; and h) then tapering RF amplitudes in the RF front-end of the phased array antenna to minimize the sidelobe level.

2. A method as in claim 1, wherein each intersection of the matrix-addressable PLC includes an upper-cladding layer that is etched so as to permit evanescent beam coupling in a selected direction.

3. A method as in claim 1, wherein each waveguide is single mode.

4. A method as in claim 1, wherein the step of optimizing RF delays line-by-line commences with obtaining an expected target peak.

5. A method as in claim 1, wherein each photodiode is a photovoltaic mode photodiode.

6. A method as in claim 5, wherein each photodiode is a PIN InGaAs photodiode.

7. A method as in claim 5, wherein each photodiode is selected such that mutual time delay differences are less than a target design timing resolution.

8. A method as in claim 1, wherein the PLC has a timing precision of up to about 0.005 ps.

* * * * *